US005759398A

United States Patent [19]

Kielbowicz

[11] Patent Number: 5,759,398
[45] Date of Patent: Jun. 2, 1998

[54] SCREEN FOR INLET OPENING OF A PUMP

[75] Inventor: Stanislaw Kielbowicz, Wädenswil, Switzerland

[73] Assignee: Sulzer Thermtec AG, Winterthur, Switzerland

[21] Appl. No.: 704,415

[22] Filed: Aug. 28, 1996

[30] Foreign Application Priority Data

Jul. 12, 1996 [EP] European Pat. Off. ............ 96810462

[51] Int. Cl.$^6$ ............................ B01D 35/02; B01D 29/33
[52] U.S. Cl. ................ 210/416.1; 210/452; 210/460; 210/489
[58] Field of Search .......................... 210/232, 416.1, 210/167, 484, 489, 452, 460, 448; 417/313

[56] References Cited

U.S. PATENT DOCUMENTS

| 3,326,382 | 6/1967 | Bozek et al. | 210/484 |
|---|---|---|---|
| 3,469,707 | 9/1969 | Humbert, Jr. et al. | 210/484 |
| 3,747,770 | 7/1973 | Zentis | 210/489 |
| 4,464,263 | 8/1984 | Brownell | 210/484 |
| 5,453,180 | 9/1995 | Henriksson | 210/167 |
| 5,468,382 | 11/1995 | Cook et al. | 210/484 |
| 5,478,469 | 12/1995 | Bryan et al. | 210/484 |

FOREIGN PATENT DOCUMENTS

WO 94/14166   6/1994   WIPO.

*Primary Examiner*—Neil McCarthy
*Assistant Examiner*—Theodore M. Green
*Attorney, Agent, or Firm*—Townsend and Townsend and Crew LLP

[57] ABSTRACT

A suction sieve has a cylindrical sieve body made up of several annular, modular cassette elements that are axially spaced apart and coupled to one another. The cassette elements surround a central suction chamber and are clamped together between an end plate that covers the suction chamber and a flange for connection to a suction line of a cooling water pump. Each cassette unit is formed of two annular, perforated side wall sections and several perforated wall segments that are circumferentially spaced apart and arranged between the side wall sections. The perforated wall segments and the side wall sections form sieve pockets that essentially extend in the radial direction and open toward the outer periphery of the sieve body so that water can flow through the sieve pockets in all directions. Discharge gaps extend in an essentially radial direction, open into the suction chamber, and are formed between the sieve pockets and between the cassette units. Water that emerges from the sieve pockets is discharged into the suction chamber through the discharge gaps. A particularly favorable ratio between the volume of the sieve body and the effective sieving surface is attained.

7 Claims, 3 Drawing Sheets

SCREEN FOR INLET OPENING OF A PUMP

BACKGROUND OF THE INVENTION

1. Field of the Invention

The invention relates to a suction sieve or screen for shielding an inlet opening of a pump; for example, a cooling water pump of an emergency cooling system of a nuclear power station, and which has an essentially cylindrical sieve body with a central suction chamber that can be connected to a suction line for the pump.

2. Description of the Prior Art

Emergency cooling systems for nuclear power plants must ensure that the nuclear reactor is intensively water-cooled in case of an emergency. During an emergency, water is available from a water reservoir of the power plant and circulated to the reactor through an emergency cooling circuit. To ensure a flawless operation of the pumps of the emergency cooling system, the inlet openings of the emergency cooling lines are provided with suction sieves which filter out objects and materials that might be present in the emergency water reservoir to prevent such objects and materials from flowing into the suction lines and pumps. These materials, e.g., mineral fibers from damaged pipeline insulation suspended in the water, are collected on the surface of the suction sieves when the emergency cooling system is in operation. To ensure a flawless operation of the pumps of the emergency cooling circuit when the suction sieve surfaces are covered with such materials, the sieves should have the largest possible sieving surface to reduce the flow rate of the water flowing past them. In addition, the suction sieves should have a limited volume to ensure that high hydrodynamic stresses, which are proportional to the suction sieve volume, do not exceed the permissible stresses that occur at the connecting region of the suction lines. One such suction sieve which attempts to achieve these objectives is described in the publication "Nuclear Engineering International", February 1996 (page 24).

SUMMARY OF THE INVENTION

It is an object of the present invention to provide an improved, compact suction sieve of the above-mentioned type which, in comparison to known sieves, has an enhanced ratio between the effective suction sieve surface and the volume of the sieve body and which further permits a simple adaptation of the dimensions of the sieve body for different suction sieve design requirements.

This is attained according to the present invention by constructing the sieve body in the form of several annular cassette units or modules which are stacked in an axial direction and coupled to one another. Each cassette unit includes several sieve pockets which are mutually offset in a circumferential direction, extend in an essentially radial direction, and open toward an outer periphery of the sieve body. Water discharge gaps or channels surround all sides of each sieve pocket and are in flow communication with the central suction chamber.

The effective suction sieve surface is, for a given volume of the sieve body, significantly larger than known sieves of corresponding sizes. The flow rate of the cooling water that flows through the sieve surface can be correspondingly lowered so that the materials which cover the suction sieve surface exhibit a relatively small flow resistance and the suction sieve generates a negligible pressure drop. This is attained by constructing the sieve pockets as modular, radially oriented units which permit the water to flow through them in all directions. The walls of the sieve pockets have an advantageously large surface through which the water can flow. Water which has passed through filtered-out material that covers the suction sieve surfaces, as well as the suction sieve surfaces themselves, is discharged into the central suction chamber of the sieve via discharge gaps which surround the sieve surfaces and do not become clogged.

DESCRIPTION OF THE PREFERRED EMBODIMENTS

Figure 1:
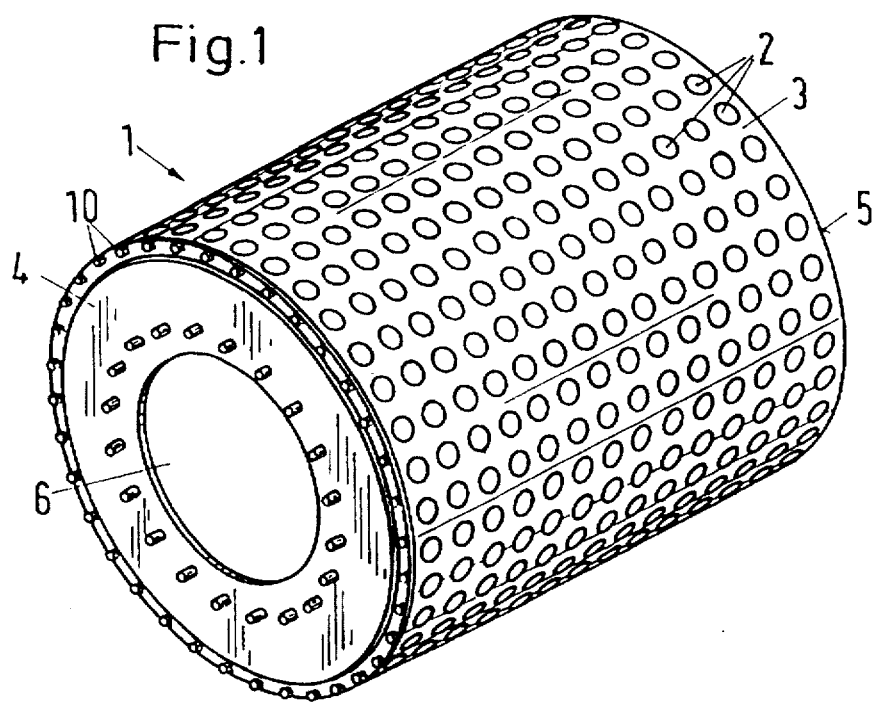
FIG. 1 is a perspective view of a suction sieve made according to the present invention.
Figure 2:
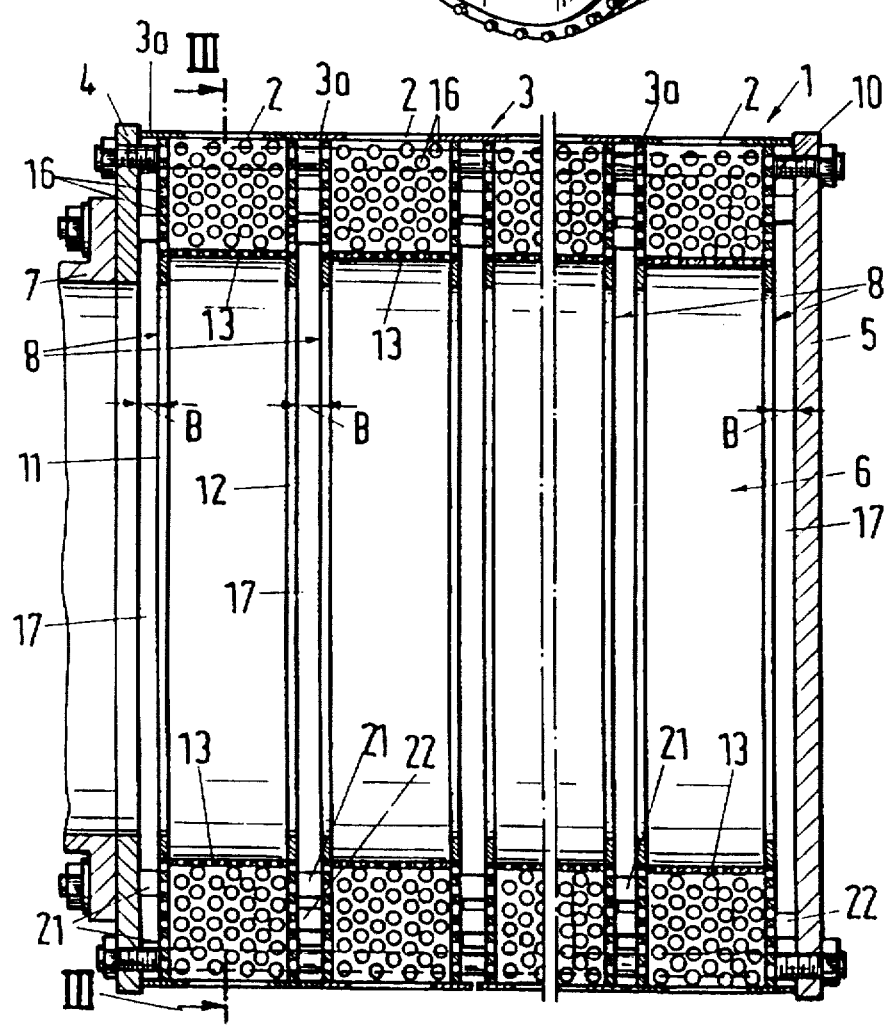
FIG. 2 is a longitudinal section through the suction sieve shown in FIG. 1.
Figure 3:
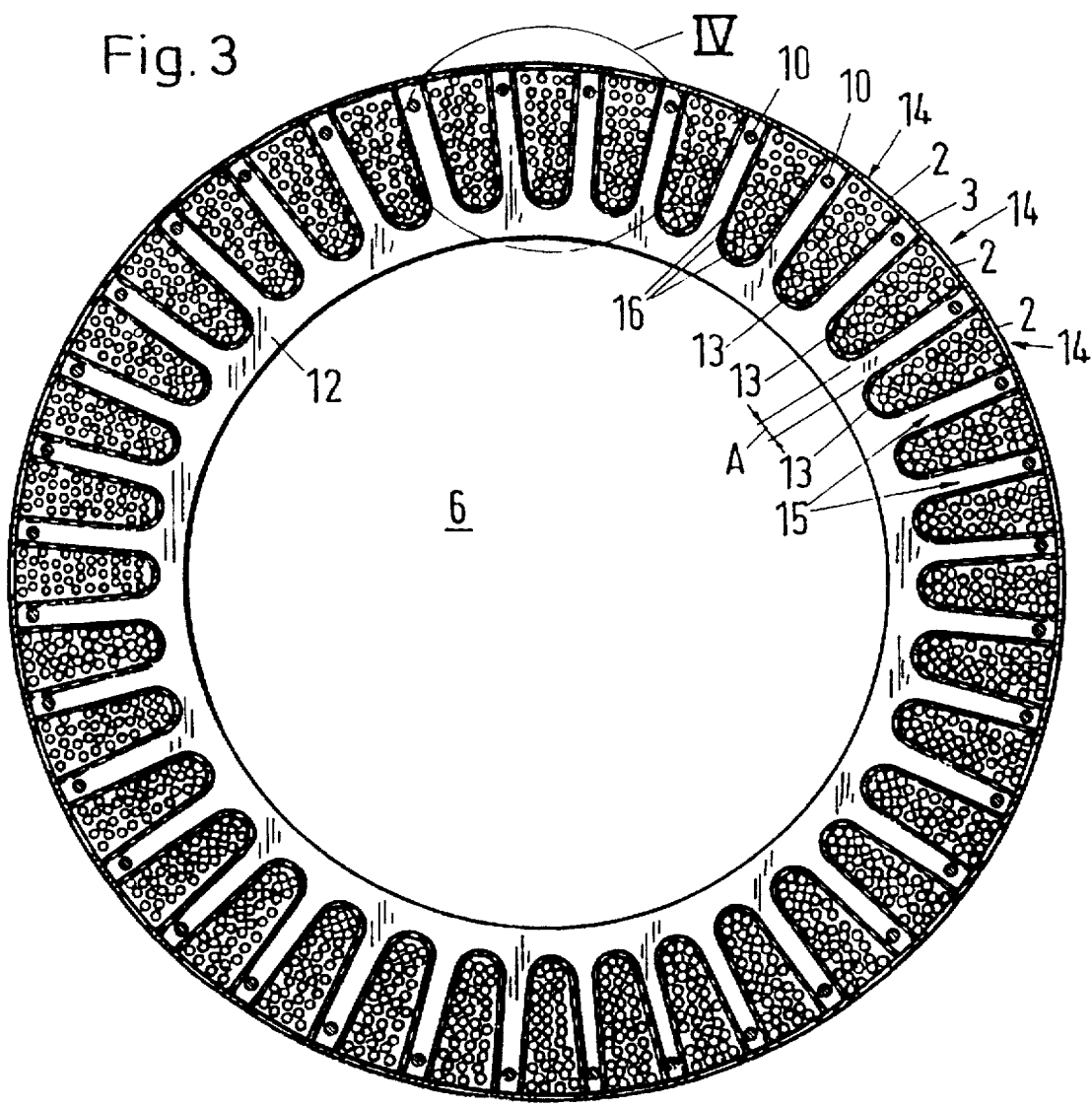
FIG. 3 is a cross-section through the suction sieve taken along line III—III of FIG. 2.

The suction sieve shown in FIGS. 1–3 comprises a cylindrical sieve body 1 which is surrounded by a peripheral wall 3 having through-holes 2. One end of the sieve body is defined by a flange 4 and the other end is formed by an end or face plate 5. Sieve body 1 surrounds a central suction chamber 6 that is closed by end plate 5 and can be connected with flange 4 to a suction line 7 of a pump (not shown), e.g., a cooling water pump of the emergency cooling circuit of a nuclear power plant. The sieve body 1 is formed of several annular, axially stacked, modular, disk-shaped cassette units 8. The cassette units mutually brace each other, and they are clamped between flange 4 and the end wall 5 by means of clamping elements, e.g., bolts 10 as shown in the drawings.

Each cassette unit 8 has two axial end wall sections 11 and 12 of perforated sheet metal which are axially spaced apart and have the shape of annular disks. Several, circumferentially spaced-apart and offset wall segments 13 are disposed between wall sections 11 and 12. Wall segments 13 are U-shaped and formed of perforated sheet metal. The perforated wall segments and the wall sections 11 and 12 together define multiple sieve pockets 14 which extend in an essentially radial direction and are open toward the outer periphery of sieve body 1. Adjacent sieve pockets 14 are spaced apart from each other by a distance "A". Adjacent wall segments 13 together with the wall sections 11 and 12 and a portion of the peripheral wall 3 that covers the wall segments form axially extending discharge gaps 15. The discharge gaps open in an essentially radially inward direction into the central suction chamber 6.

Figure 4:
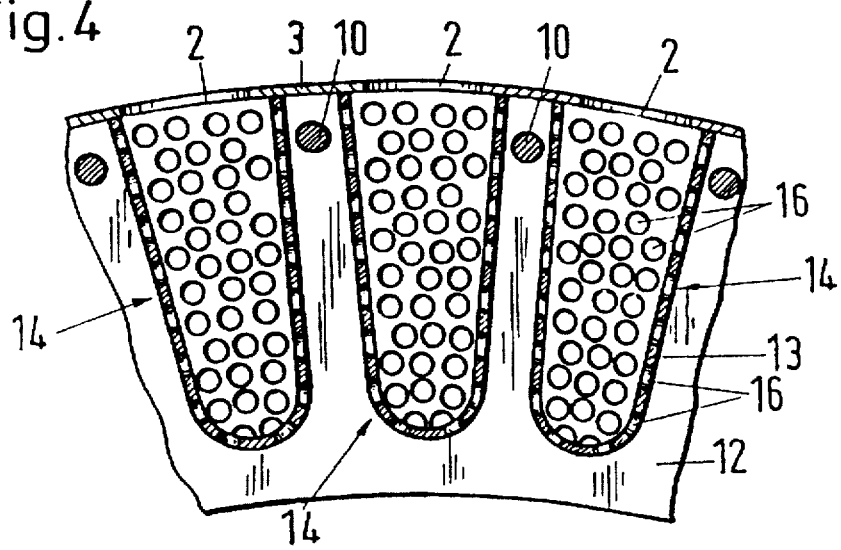
FIG. 4 is an enlarged detail within line IV of FIG. 3.

The respective wall sections 11 and 12 can be provided with a perforation over their entire annular surface or they can be provided with through-holes 16 in the region of the sieve pockets 14 only as is shown in the drawings. In the latter instance, the discharge gaps 15 formed between wall segments 13 are axially limited by portions of the wall sections 11 and 12 which have no through-holes. Each cassette unit 8 is spaced an axial distance B from the adjacent cassette units 8, or from flange 4 and end wall 5. Adjacent wall sections 11 and 12 and the section of the peripheral wall 3 between them form a ring-shaped, circumferential discharge gap 17 that opens into the central suction chamber 6. FIGS. 2, 3 and 4 clearly show that the through-holes 2 in the peripheral wall 3 are arranged within the region of sieve pockets 14. The through-holes are dimensioned so that they extend over at least a major portion of the cross-section of each sieve pocket 14 to ensure that water can freely flow through them.

The peripheral wall 3 can be manufactured of a perforated sheet metal, for example in the form of a one-piece, tubular casing that extends over the axial length of all cassette units 8 as is shown in FIG. 1. The ends of the tubular casing are braced against and sealed with respect to flange 4 and end wall 5. According to FIGS. 2 and 5, peripheral wall 3 can also be made of individual pipe sections 3a which are clamped together with bolts 10. Each such pipe section surrounds one cassette element 8 and is connected to the walls 11 and 12 of that cassette element. FIG. 2 shows that the flange 4 and end wall 5 are formed as covers which are free of through-holes and, together with the adjacent walls 11 and 12, respectively, form circumferential discharge gaps 17.

Figure 5:
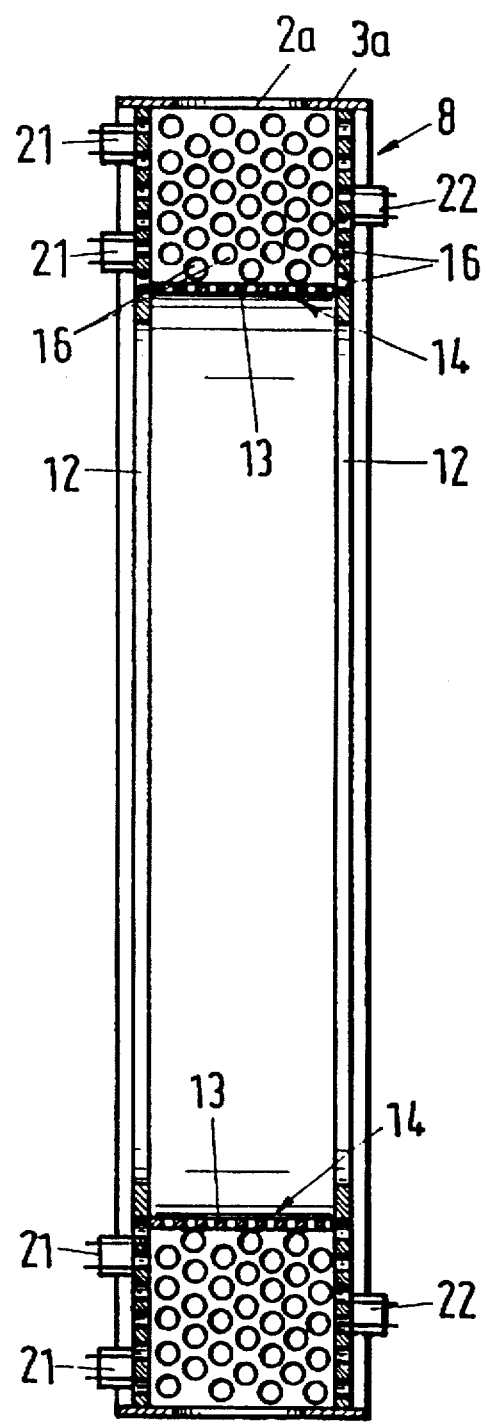
FIG. 5 is an enlarged detail of a portion of FIG. 3.

The circumferential discharge gaps 17 are formed with spacers 21 and 22 arranged between opposing wall sections 11 and 12 of adjacent cassette units 8. The spacers protrude from one face of wall sections 11 or 12 toward the adjacent, opposite face of the other one of wall sections 12 or 11. Spacers 21, 22 can be formed by support elements that are appropriately secured to the wall sections. Alternatively, and as is shown in FIG. 5, they can be formed by projections formed by wall segments 13 which extend through respective ones of the wall sections 11 or 12. In such an event, the projections extend through holes (not shown) in the corresponding side wall sections 11 or 12.

As mentioned above, the suction sieve of the present invention provides a particularly favorable ratio between the volume of the sieve and its effective sieve surface due to the fact that the water flows through outwardly opening sieve pockets 14 each of which forms a partial sieving volume. Water drawn through holes 2 in the peripheral wall 3 flows from the partial sieving volumes through the perforated walls of the sieve pockets 14, which provide flow paths in all directions, and is then discharged into the central suction chamber 6 via discharge gaps 15 and 17. The division of the total volume of the sieve body into partial volumes, from which the water can be individually removed by suction, results in an optimal utilization of the suction sieve volume, i.e., the flow rate of the water flowing through the sieve surfaces is significantly reduced.

The suction sieve of the present invention allows a particularly efficient backwashing of the sieve for the intermittent, rapid removal and discharge of the filtered-out materials that have collected on the sieve surfaces by reversing the flow direction of the water, or backwashing the sieve. To ensure an efficient removal of the layer of filtered-out materials covering the sieve surfaces, the backwash water flow rate is relatively high. This is contrary to the desired minimal pressure drop during normal use of the sieve and is achieved in accordance with the invention because the sieve surface to be backwashed is essentially limited to the radial suction pockets 14 and the outer suction sieve surfaces function as flow-impervious covers except for the holes 2 in peripheral wall 3 which are assigned to the respective sieve pockets 14. The backwashing flow rate is therefore significantly increased because the entire backwash flow can only emerge from sieve body 1 through the holes 2 associated with each sieve pocket 14. Consequently, the materials collected in the radial sieve pockets 14 are expelled through holes 2 at relatively high speeds. They precipitate on the bottom of the water reservoir after their removal from the suction sieve.

The modular cassette units 8 can have identical widths, as is shown in FIG. 2, or they may have different widths. The required number of cassette units 8 for a given sieve are combined and clamped together with clamping bolts 10, or with any other suitable clamping elements, to form a compact sieve 1.

The invention can therefore be summarized as follows:

The suction sieve of the present invention has a cylindrical sieve body made up of several annular cassette units or modules which are axially spaced apart and secured to one another. The cassette units surround a central suction chamber and are clamped between an end plate or wall that covers the suction chamber and a flange that can be connected to the suction line of a cooling water pump. Each cassette unit is formed of two annular, perforated wall sections and several, circumferentially spaced-apart, perforated wall segments which are disposed between them. These perforated wall segments and the wall sections form sieve pockets which are essentially radially oriented and open toward the outer periphery of the sieve body. Water can flow past the sieve pockets in all directions. Essentially radially oriented discharge gaps are formed between the sieve pockets and between the cassette units and lead into the suction chamber of the sieve. Water which emerges from the sieve pockets is discharged into the suction chamber through the discharge gaps. Consequently, a particularly favorable ratio between the volume of the sieve body and the effective sieving surface is attained.

What is claimed is:

1. A suction sieve for shielding an inlet opening of a suction line of a pump such as a cooling water pump of an emergency cooling system of a nuclear power station, the suction sieve comprising a substantially cylindrical sieve body having a central suction chamber that can be connected to the suction line, the sieve body comprising several annular, modular cassette units which are stacked in the axial direction and coupled to one another, each cassette unit including several sieve pockets which are circumferentially spaced apart, extend in a substantially radial direction, and open toward an outer periphery of the sieve body, each sieve pocket being surrounded by discharge gaps that are in flow communication with the central suction chamber.

2. A suction sieve according to claim 1, wherein the cassette units are axially spaced a first distance from each other, each cassette unit including first and second annular, perforated side wall sections that are spaced apart in the axial direction and several perforated, U-shaped wall segments that are arranged at a second distance from one another, each wall segment together with associated side wall sections forming one of the sieve pockets, the discharge gaps being defined by gaps defined by the first and second distances between the respective wall segments or between the respective side wall sections.

3. A suction sieve according to claim 2, including a peripheral wall surrounding the cassette units and having at least one through-hole associated with each wall segment so that water can flow toward a corresponding radial sieve pocket through the through-hole.

4. A suction sieve according to claim 2 wherein the discharge gap formed between the cassette units is defined by spacers arranged between the side wall sections.

5. suction sieve according to claim 4, wherein the spacers are formed by portions of the wall segments which locally protrude past the side wall sections, and wherein the side wall sections have through-holes for accommodating the portions so that the portions extend through the through-holes.

6. A suction sieve according to claim 1 wherein the cassette units are arranged between a flange that can be connected to the suction line and an end plate that closes the central suction chamber, the cassette units being secured to each other by means of several clamping elements disposed between the end plate and the flange.

7. A suction sieve according to claim 6, wherein the end plate and the flange comprise covers which are free of through-holes.

* * * * *